No. 786,681. PATENTED APR. 4, 1905.
T. REDMAN.
APPARATUS FOR PURIFYING GAS.
APPLICATION FILED APR. 16, 1904.
4 SHEETS—SHEET 1.
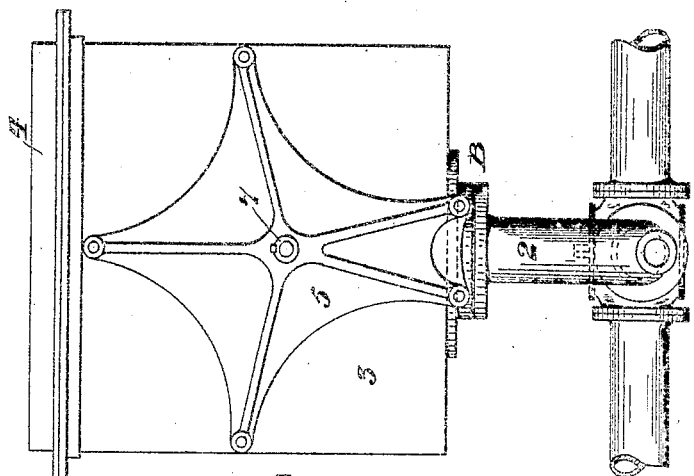
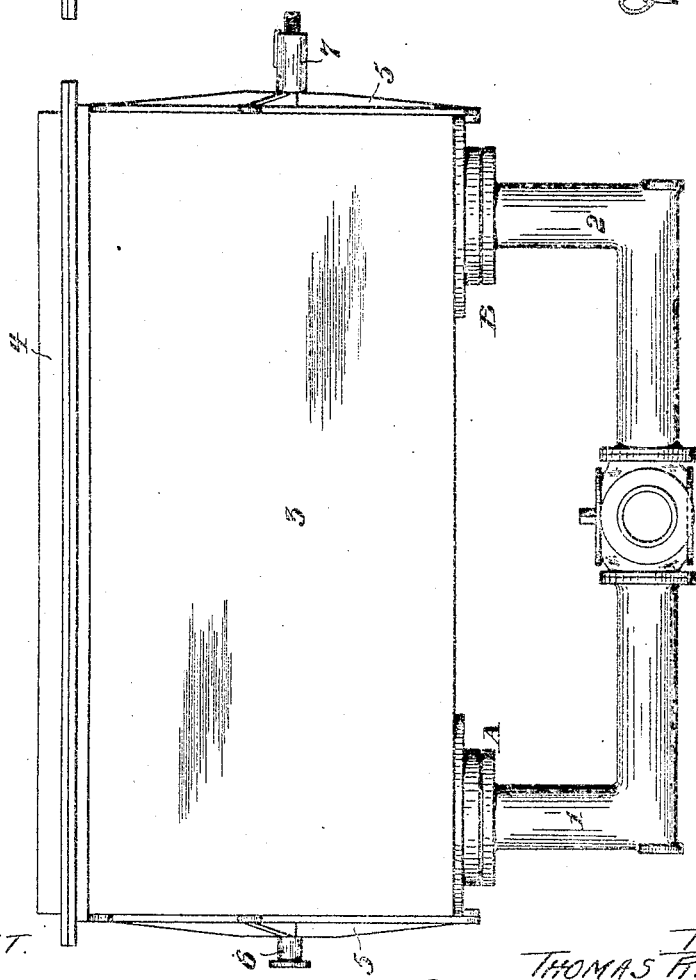

No. 786,681. PATENTED APR. 4, 1905.
T. REDMAN.
APPARATUS FOR PURIFYING GAS.
APPLICATION FILED APR. 16, 1904.
4 SHEETS—SHEET 2.
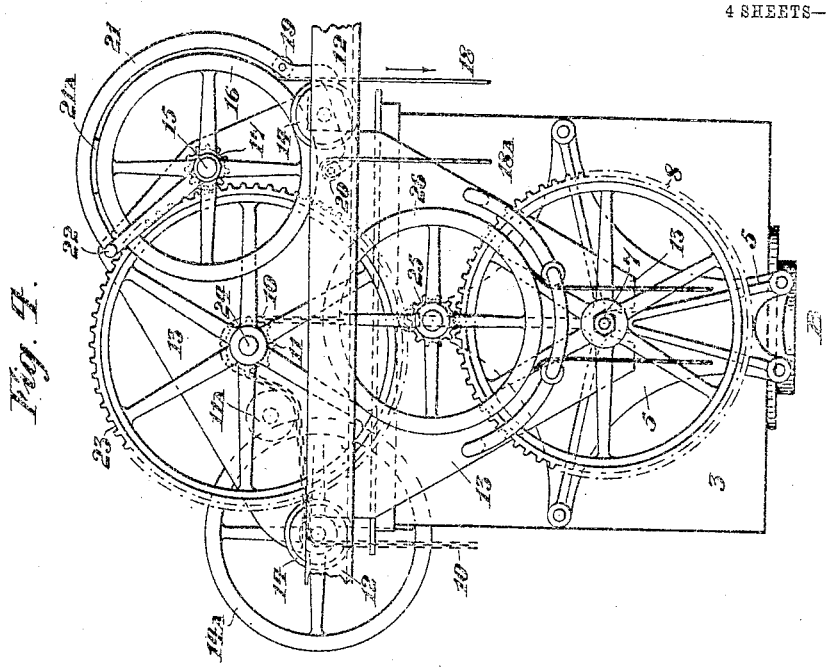
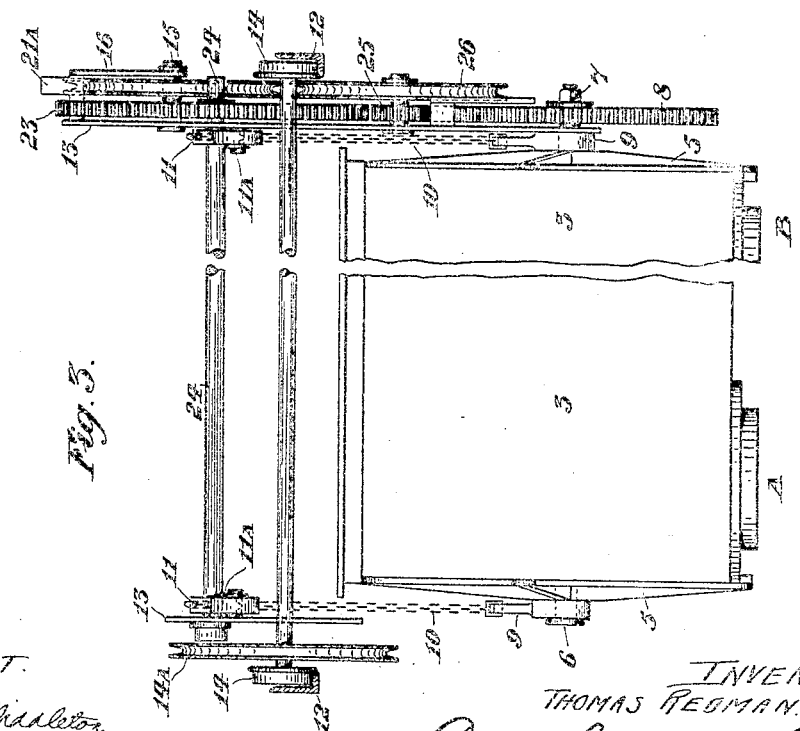

No. 786,681. PATENTED APR. 4, 1905.
T. REDMAN.
APPARATUS FOR PURIFYING GAS.
APPLICATION FILED APR. 16, 1904.
4 SHEETS—SHEET 3.
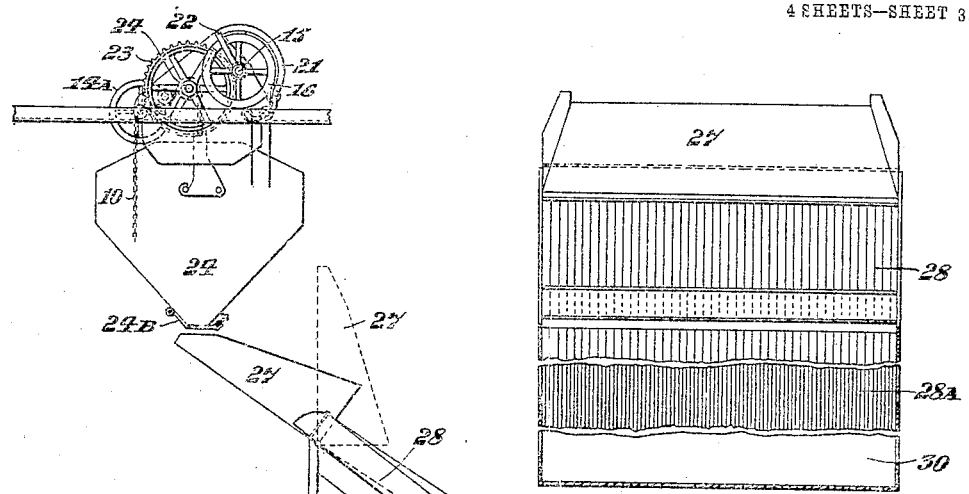
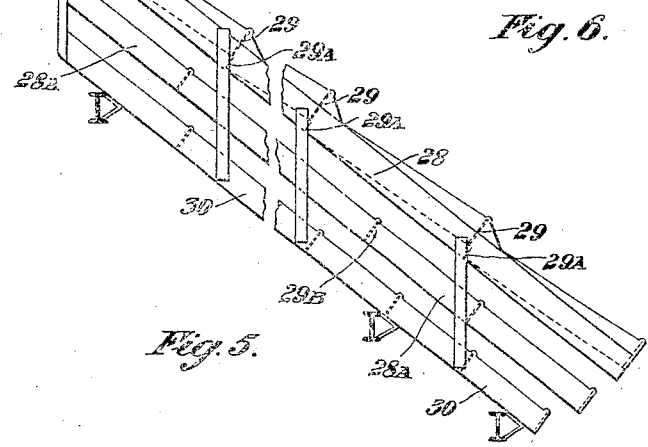
Fig. 6.
Fig. 5.
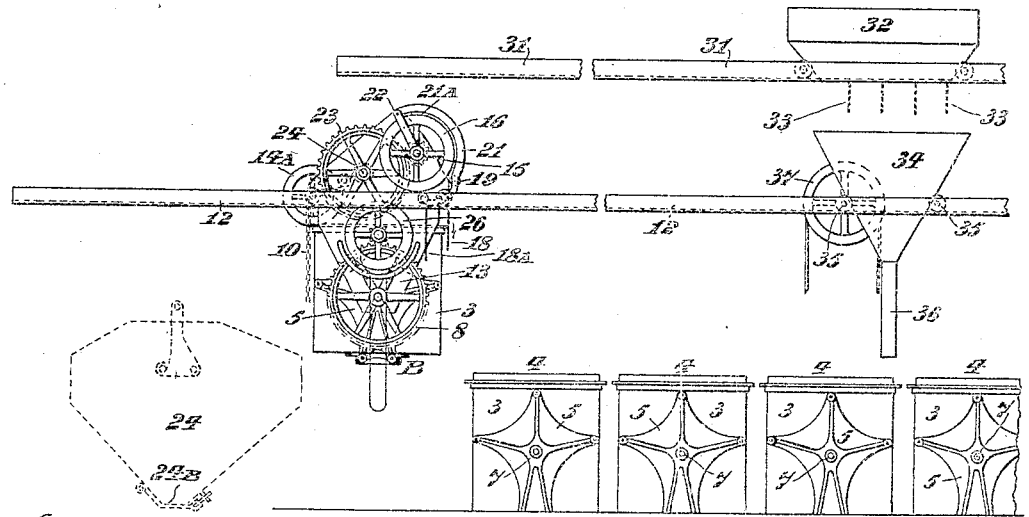
ATTEST:
INVENTOR
THOMAS REDMAN.
BY Ellis Spear & Company
ATTYS No. 786,681. PATENTED APR. 4, 1905.
T. REDMAN.
APPARATUS FOR PURIFYING GAS.
APPLICATION FILED APR. 16, 1904.
4 SHEETS—SHEET 4.
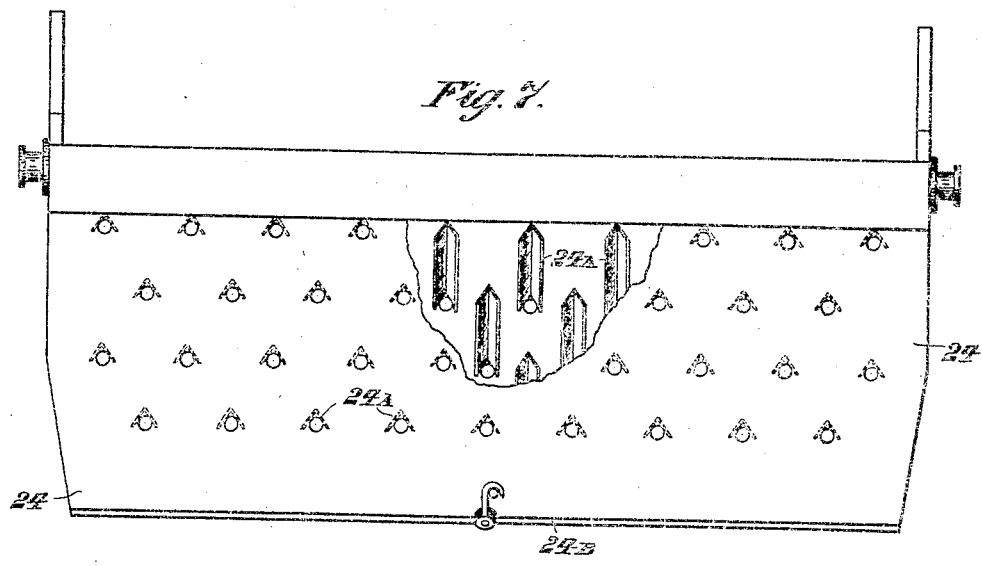
ATTEST.
CJ Middleton
Edward Saxton
INVENTOR.
THOMAS REDMAN.
BY Ellis Spear & Company
ATTYS.

No. 786,681.

Patented April 4, 1905.

UNITED STATES PATENT OFFICE.

THOMAS REDMAN, OF BRADFORD, ENGLAND.

APPARATUS FOR PURIFYING GAS.

SPECIFICATION forming part of Letters Patent No. 786,681, dated April 4, 1905.

Application filed April 16, 1904. Serial No. 203,503.

*To all whom it may concern:*

Be it known that I, THOMAS REDMAN, a subject of the King of Great Britain and Ireland, and a resident of The Priory, Bolton, Bradford, in the county of York, England, have invented certain Improvements in and Relating to Apparatus for Purifying Gas, (for which I have obtained provisional protection in Great Britain, No. 105, dated January 2, 1904,) of which the following is a specification.

The object of this invention is to construct and combine with tanks applicable for the purification of gas mechanism by which purifying-tanks may be readily removed from or placed in connection with a range of gas-pipes leading to and from the purifying-tanks by adapting the said tanks so that they may be mechanically emptied of the purifying agency placed therein and expeditiously refilled by apparatus constructed and arranged in such a manner as to assist in the revivification, breaking up, or pulverizing of the oxid or like purifying material and to deposit such material in an efficient manner when desired in a purifying-tank.

In describing my invention in detail reference is made to the accompanying drawings, in which—

Figure 1 represents an elevation of a gas-purifying tank, shown in position in relation to a gas-supply range of pipes. Fig. 2 is an end elevation of same. Fig. 3 is a view showing a purifying-tank suspended for conveyance into a position ready for emptying. Fig. 4 is an end view of same and mechanism suitable for lifting and conveying the tank. Fig. 5 is a diagrammatic elevation, drawn to a reduced scale, showing a series of purifying-tanks, along with lifting and conveying apparatus, pulverizing and revivification screens, and suitable means for refilling the tanks. Fig. 6 is a front view showing a portion of the screens; Fig. 7, a side elevation of a hopper, partly in section, adapted for receiving and assisting in the breaking up and revivification of the oxid and lifting same to an elevation; and Fig. 8 is an end view of same.

In carrying out my object the inlet and outlet branches 1 and 2 of the gas-pipes leading to and from a purifying-tank 3 are provided with flanges corresponding with those of the purifying-tank at A and B, and are so arranged that when a tank 3 is placed in position on the said branch pipes, as shown, with suitable flexible joint-forming material between the respective flanges, gas-tight joints are formed without the aid of bolts or the like for nipping same together. The interior of each tank is arranged for the reception of grids, as hitherto, for supporting the oxid or other purifying material.

The cover 4 of each purifying-tank 3 may be jointed to the tank by placing a belt of flexible material, such as india-rubber, between tank 3 and lid 4, which when tightened together form a gas-tight joint independent of an ordinary lute-joint.

In order that purifying-tanks 3 may be mechanically emptied instead of having to delay the operation of emptying until the gas fumes have to some extent passed off or subsided and of persons having, as hitherto, to get inside the tanks and throw out the purifying material by hand labor, I secure to each end of a tank 3 a strengthening-plate 5, from which projects a trunnion 6 at one end of tank and a trunnion 7 at the other end of a length suitable for the reception of a spur-wheel 8, arranged to engage with a feather-key of the ordinary description sunk in said trunnion in a manner that the wheel may be readily placed and secured thereon or removed when necessary. The trunnions are applicable for the reception of lifting-bars 9, connected to pitch-chains 10, which pass over and engage with the teeth of sprocket-wheels 11, forming part of the lifting-gear, hereinafter described, mounted on girders 12, placed above the range of purifying-tanks 3.

The frame-plates 13 of before-mentioned lifting-gear are mounted on pulleys 14, resting on girders 12, and projecting from one of the frame-plates 13 is a shaft or stud 15, upon which is mounted a grooved pulley 16 and a spur-pinion 17, secured together. Around the grooved pulley is an endless rope 18, guided by the small pulleys 19 and 20, both of which are supported on studs attached to brake-arm 21, supported by a pin at 22 and provided with a brake-block engaging with pulley-groove at 21ᴬ. On pulling the endless rope 18 in the direction of arrow in Fig. 4 it will be understood that the brake-arm 21 will be operated on before-mentioned pin and block 21ᴬ raised clear of the pulley-groove, allowing the pulley to be rotated; but on pulling downward at 18ᴬ the other hanging portion of rope the brake-block will be brought into tight contact with the groove of pulley, the said block continuing to act as a brake when the rope is free and arm 21 in its normal position. On rotating grooved pulley 16 and spur-pinion 17 the latter gearing with spur-wheel 23, secured on shaft 24, is rotated, also the sprocket-wheels 11, secured on said shaft. Pitch-chains 10 engage with the sprocket-wheels 11 and pass under guiding-pulleys 11ᴬ, mounted on a shaft or stud supported by frame-plates 13, so that on the rotation of sprocket-wheels the purifying-tank 3, suspended by the pitch-chains, is raised or lowered and when raised, as shown by Figs. 3, 4, and 5, may be conveyed on girders 12 on the rotation of grooved pulley 14ᴬ to the position required for mechanically emptying the tank, such as over hopper 24, which is provided with a number of angular cross-bars 24ᴬ, attached to the interior of hopper. When a lid 4 is removed and a purifying-tank 3 lifted to the position shown by Figs. 3, 4, and 5, the trunnion 7 engages with a recess formed at the bottom end of one of the frame-plates 13, as shown. The spur-wheel 8, mounted on trunnion 7, is then in gear with pinion 25, attached to grooved pulley 26, suitably supported by a stud projecting from one of the frame-plates 13, so that on conveying same on girders to the position required and rotating the grooved pulley 26 the spur-wheel 8 is operated and tank 3 turned into position for emptying same of its purifying material into the hopper 24. The material falling upon the angular cross-bars 24ᴬ assists in breaking up and pulverizing the material. These angular bars are fixed within the hopper at an inclination, and at each end of the bars is an opening through the hopper-walls communicating with the under side of the respective angular cross-bars, thereby affording means for the outlet of fumes and inlet of fresh air for assisting in the revivification of the oxid. By arranging the angular cross-bars 24ᴬ at an inclination, as shown, some of the fumes escaping from the oxid during revivification rising from the material below the angular cross-bars 24ᴬ gather in the channels formed on the under side of said bars, thereby allowing the fumes to more readily escape at the upper ends of the respective inclined cross-bars, and thus reduce the liability of stagnancy, as would otherwise be the case should the bars be placed horizontal.

It will be obvious that by placing the angular bars 24ᴬ at an inclination and the fumes escaping in the manner described fresh air will enter at the bottom ends at the lower inclination of said angular bars and that some of the fresh air will spread into the material by escaping under each open edge of the bars, and on the air rising through the deposited material the action of revivification is commenced immediately the material leaves a purifying-tank 3 after emptying in the manner described, after which the tank is ready to be replaced in its position, refilled, and set to work again in a considerably less space of time than when emptied and refilled in the manner as hitherto.

The hopper 24 and deposited contents may be raised from the position shown by dotted lines to that shown by full lines in Fig. 5 by lifting-gear similar to that already described, and when raised on opening a hinged door 24ᴮ the spent purifying material is allowed to escape into hinged chute 27 to the inclined screens or grids 28, the length of which is divided into a series of compartments by hinged doors 29, a step or drop being formed at 29ᴬ between one compartment and another, so that on allowing the purifying material to slide or drop from one compartment to another the tendency of such is to open out and change the position of the material and remove the clogging by the turning action given to it on falling over the steps, the fine particles dropping through the screens 28 to a series 28ᴬ of finer mesh, which may be arranged with similar steps and hinged doors 29ᴮ for the purpose, as before described, or left straight, as shown. In either case the fine pulverized material drops through lower screens 28ᴬ to a non-perforated chute 30, which may be provided with similar steps and hinged doors or left straight, as shown.

Above the floor, level with girders 12, is another set of girders 31, forming traveling lines, supporting what I term a "traveling measuring-hopper" 32, provided with doors at the bottom. (Shown open by dotted lines 33.) These may be secured horizontally in any convenient manner to form the bottom of measuring-hopper 32, into which the requisite quantity of disintegrated and revivified purifying material from the before-mentioned chutes is deposited, and afterward emptied into a hopper 34, supported on girders 12 by pulleys 35, the outlet of said hopper being by preference a narrow trunk 36 of a length equal to about that of a purifying-tank, a suitable hinged retaining bottom or stop being provided at the base of hopper immediately above the narrow trunk for holding the material within the hopper until it is to be emptied.

One of the axles of carriage supporting hopper 34 is provided with a grooved rope-pulley 37, on the rotation of which the hopper may be traversed to and fro for evenly distributing the pulverized purifying material within a tank 3, or the trunk 36 may be suspended by hinges or the like and oscillated over the tank for distributing and evenly spreading said material.

From the foregoing description it will be seen that the emptying of purifying-tanks 3, the pulverizing and placing in position of the purifying-oxid for revivification, and the refilling of the tanks are all effected by mechanical means combined together in a novel manner to work in unison for the purpose described.

What I claim as my invention is—

1. In combination, a purifying-tank, mechanism above the same for lifting the said tank, said mechanism being movable in its elevated position to convey the tank, means for emptying the tank, a receptacle for receiving the material from the tank and for breaking up and revivifying the said material, and means for directing the material back to the tank, substantially as described.

2. A purifying-tank provided with trunnions, inlet and outlet pipes having flanges on which the tank is adapted to rest, a spur-wheel mounted on one of said trunnions, means for elevating said tank, a support for said elevating means, and means on said support including a grooved pulley and a pinion engaging with said spur-wheel for tilting the tank, substantially as described.

3. In combination, a tank having inlet and outlet openings in its bottom and adapted to rest removably on seats about supply and discharge openings for the gas, said tank having trunnions, tracks above the tank, a spur-wheel adapted to fit one of the trunnions and mechanism supported on the tracks for elevating the tank and means engaging the spur-wheel for turning the tank.

4. In combination, purifying-tanks, means for lifting and emptying the same, means for receiving and breaking up the material emptied from the tank, means for lifting the breaking means and discharging the material therefrom, a series of screen-surfaces having steps for receiving the material, a measuring-hopper to receive the material from the screens and a distributing-hopper to distribute the material to the tanks, substantially as described.

5. In combination, purifying-tanks, means for lifting and emptying the same, means for receiving the material from the tanks and for breaking up the material, means for lifting the breaking means and discharging the material therefrom and distributing means for receiving the broken material and discharging it into the tanks, substantially as described.

In witness whereof I have hereunto set my hand in the presence of two witnesses.

THOMAS REDMAN.

Witnesses:
   W. ILLINGWORTH,
   E. HAMMOND.